United States Patent [19]

Norbeck

[11] 4,027,204
[45] May 31, 1977

[54] PHASE FAILURE DETECTION CIRCUIT FOR MULTI-PHASE SYSTEMS

[75] Inventor: Dean King Norbeck, York, Pa.

[73] Assignee: Borg-Warner Corporation, Chicago, Ill.

[22] Filed: Jan. 28, 1976

[21] Appl. No.: 652,918

[52] U.S. Cl. .............................. 361/1; 340/253 B; 340/248 B
[51] Int. Cl.² .................................. H02H 3/24
[58] Field of Search ............... 317/27 R, 46–48, 317/31; 340/253 B, 253 Y, 253 C, 253 H, 253 N, 248 B; 324/86, 96, 133; 307/127, 130, 235 T, 235 W, 232; 328/149

[56] References Cited

UNITED STATES PATENTS

| | | | |
|---|---|---|---|
| 2,759,177 | 8/1956 | Hightower | 340/253 C |
| 3,160,786 | 12/1964 | Faglie | 361/86 |
| 3,242,383 | 3/1966 | Opad | 361/88 |
| 3,243,796 | 3/1966 | Harmon et al. | 340/253 |
| 3,343,038 | 9/1967 | Johnson | 361/100 |
| 3,452,347 | 6/1969 | Stimson | 324/133 X |
| 3,749,944 | 7/1973 | Luebrecht | 307/235 T |
| 3,854,089 | 12/1974 | Emler | 340/253 C X |

OTHER PUBLICATIONS

IBM Technical Disclosure Bulletin, vol. 16, No. 8, pp. 2760–2761, Jan. 1974.
IBM Technical Disclosure Bulletin, vol. 17, No. 12, p. 3513, May 1975.

*Primary Examiner*—Harry E. Moose, Jr.
*Attorney, Agent, or Firm*—James J. Jennings

[57] ABSTRACT

A three-phase rectifier circuit is connected to provide a d-c output voltage as a function of the three-phase energy passed to the rectifier circuit. This energy is reduced in amplitude over a voltage divider circuit and passed through an optically-coupled detector circuit to provide a control signal indicating the presence of energy on all phase conductors of the supply line. If a fuse blows in one line, or if the power on that line is interrupted for any reason, the ripple content of the rectified voltage increases. This is sensed by a detector circuit to energize an alarm and/or interrupt the main power bus to the load.

4 Claims, 4 Drawing Figures

4,027,204

PHASE FAILURE DETECTION CIRCUIT FOR MULTI-PHASE SYSTEMS

BACKGROUND OF THE INVENTION

In the energization of three-phase motors or other apparatus with a plurality of individual phase conductors, different approaches have been devised in an effort to protect the load from damage if one of the individual phase conductors is interrupted, leaving only single-phase energy between the other two conductors. Many of these known arrangements are not oriented in a fail-safe direction. That is, when the fuse in one phase conductor blows or the power on that conductor is otherwise lost, this condition is detected and some resultant operation is initiated. It is therefore a principal object of the present invention to provide a protection system which produces a control signal which always remains above an effective reference or threshold level, indicating the presence of energy on all phase conductors of the mains. This control signal drops below the threshold value when a fault or open condition occurs, thus operating in a fail-safe manner.

Another important object of the invention is to provide an indication of trouble on a three-phase line when a low voltage or "brown-out" condition occurs.

Still another important object of the invention is to provide such an arrangement in a compact, inexpensive unit.

SUMMARY OF THE INVENTION

A phase failure detection circuit provide in accordance with this invention is suitable for use with a power system in which multi-phase energy is passed over a plurality of main electrical conductors to energize an electrical load. The invention includes a rectififer circuit, which has a plurality of input connections coupled to the main electrical conductors. A d-c voltage is provided by the rectifier circuit at a pair of output connections. A radiation-emitting semiconductor is coupled to the rectifier circuit to produce radiation as a function of the d-c voltage. A radiation-sensitive semiconductor is optically coupled to the radiation-emitting semiconductor, thus providing an electrical control signal which varies as a function of the incident radiation received from the radiation-emitting semiconductor.

In accordance with an important aspect of this invention, this control signal remains above a predetermined reference value so long as the input energy of appropriate amplitude is present on all main conductors. A detector stage is coupled to the radiation-sensitive semiconductor, to provide an output signal when the control signal drops below the predetermined reference value, thus providing fail-safe operating of the phase failure detection circuit.

In accordance with another aspect of the invention, a voltage divider circuit can be coupled to the output side of the rectifier circuit, to provide a lower d-c voltage at an intermediate connection. In addition a semiconductor unidirectional switch can be coupled between this intermediate connection of the voltage divider circuit and the radiation-emitting semiconductor, to reduce the voltage utilized to produce the radiation. Use of the semiconductor unidirectional switch, and additional protective resistors which can be connected between the line and the rectifier circuit, minimizes the possibility that the inventive circuit will be erroneously triggered by spurious transient signals on the main power conductors.

THE DRAWING

In the several figures of the drawing, like reference numerals identify like components, and in that drawing.

GENERAL SYSTEM DESCRIPTION

Figure 1:
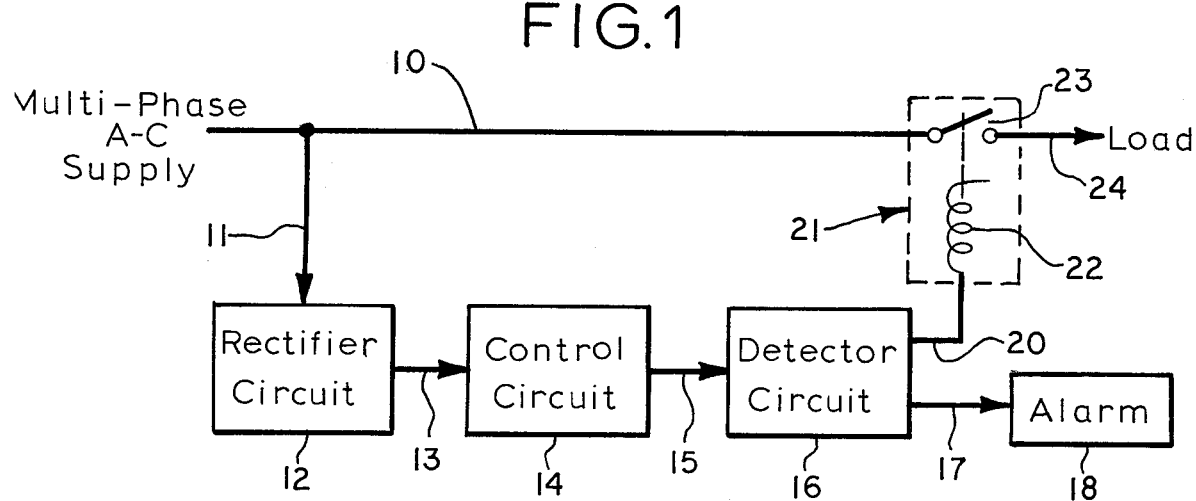
FIG. 1 is a block diagram of the system of the invention incorporated with a power transfer arrangement.

In the simplified block arrangement of FIG. 1, a plurality of main electrical conductors is represented by a single line 10. A portion of the multi-phase energy on these conductors is passed over a corresponding number of conductors, represented by line 11, to rectifier circuit 12 which produces a d-c output voltage on another pair of conductors represented by line 13. This d-c voltage has an average value and a ripple content which are functions of the multi-phase voltage on lines 10 and 11. That is, with a three-phase input voltage there is little ripple as contrasted to the half-wave rectified voltage which is provided when only single-phase energy is present on the input conductors 11. This d-c voltage is applied to a control circuit 14, to produce on the output conductors 15 a control signal which remains above a predetermined reference value so long as input energy is present on all the main conductors 10. A detector circuit 16 is provided to produce an output signal on conductors 17 to energize an alarm 18 when the control signal drops below a predetermined reference value, indicating failure of power in a single phase circuit or a reduced-amplitude multi-phase voltage, such as occurs in a brown-out. Detector circuit 16 also provides a signal on line 20 to energize a relay 21, which includes a winding 22 and a plurality of contact sets 23, represented by a showing of a single contact set. When the control signal remains above the normal reference or threshold value, a signal is provided on line 20 to energize the relay and thus close the contact sets, passing the input a-c energy over a plurality of cnductors 24 to energize the load (not shown).

DETAILED DESCRIPTION OF THE INVENTION

Figure 2:
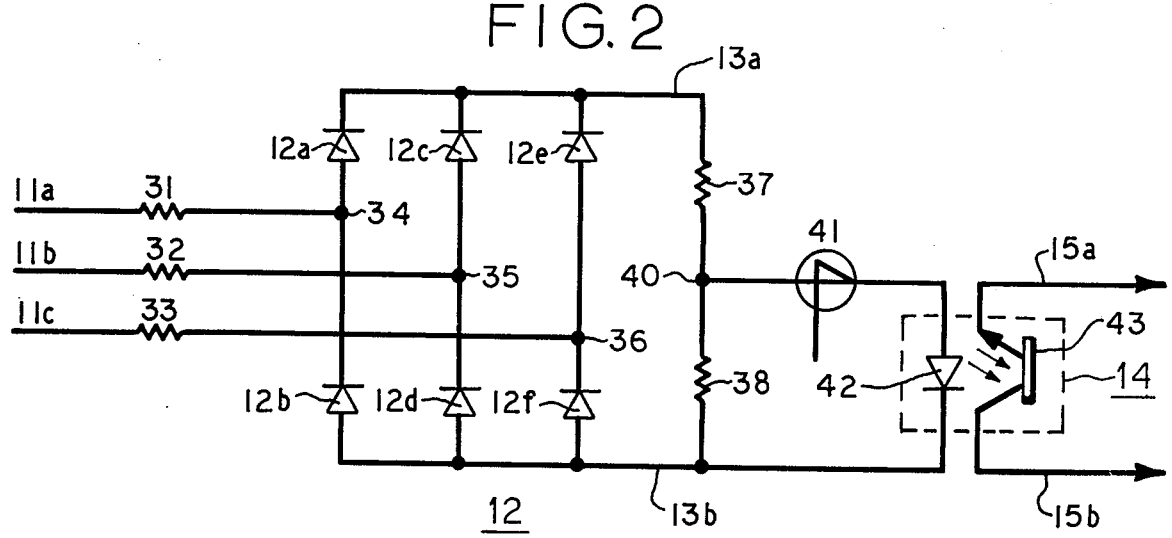
FIG. 2 is a schematic diagram of major components of the present invention.

FIG. 2 depicts rectifier circuit 12 and control circuit 14 in more detail, together with other components. The input conductors 11a, 11b and 11c which are coupled to the main power conductors 10, transfer energy over protective resistors 21, 32 and 33 to the input connections 34, 35 and 36 of the rectifier circuit 12. The six diodes 12a–12f depicted in the circuit could, of course, be thyristors such as silicon-controlled rectifiers, or power transistors, or any other suitable units including tube-type rectifiers such as thyratrons. The rectifier circuit operates in a well known manner to provide a d-c voltage on the output connections or conductors 13a, 13b.

To make the invention suitable for use with high voltage systems, including those with amplitudes over 500 volts, a voltage divider circuit including a pair of resistors 37, 38 is coupled to the rectifier bridge circuit output connections 13a, 13b. This voltage divider circuit includes an intermediate connection 40 for providing a lower d-c voltage than is present across conductors 13a, 13b. A semiconductor unidirectional switch 41 has a pair of connections, one of which is coupled to the intermediate connection 40 of the voltage divider circuit. The other side of switch 41 is coupled to one input connection of the control circuit 14. In a preferred embodiment the control circuit 14 includes a radiation-emitting semiconductor shown as a light-emitting diode (LED) 42 which is coupled to one side of semiconductor unidirectional switch 41. The other side of the diode 42 is connected to output conductor 13b, which is also coupled to one side of the voltage divider circuit. Thus LED 42 produces radiation as a function of the amplitude of the d-c voltage present between intermediate connection 40 of the voltage divider circuit and conductor 14b. The control circuit 14 further comprises a radiation-sensitive semiconductors 43, such as a phototransistor, which is optically coupled to the radiation-emitting semiconductor 42. The radiation-sensitive semiconductor 43 produces an electrical control signal responsive to incident radiation received from the light-emitting diode 42. Various types of units 14 are commercially available which include both the emitting and radiation-sensitive units, and one suitable unit is identified at the end of this specification. Thus the unit 14 produces a control signal as a function of the incident radiation, and the control signal is applied between conductors 15a, 15b for passage to any suitable detector circuit 16. This detector stage 16 is coupled to the control circuit 14 in a manner to provide an output signal when the control signal on conductors 15a, 15b drops below a predetermined reference value, in a manner to provide fail-safe operation of the complete detection circuit.

Figure 3:
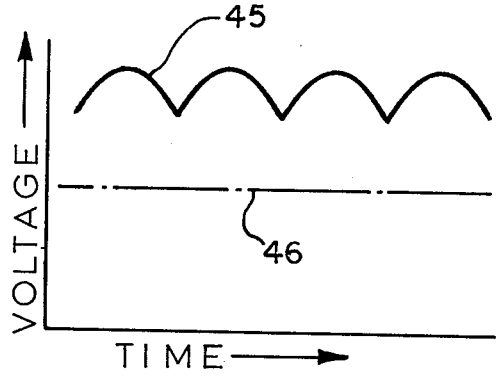
FIGS. 3 and 4 are graphical illustrations useful in understanding operation of the present invention.
Figure 4:
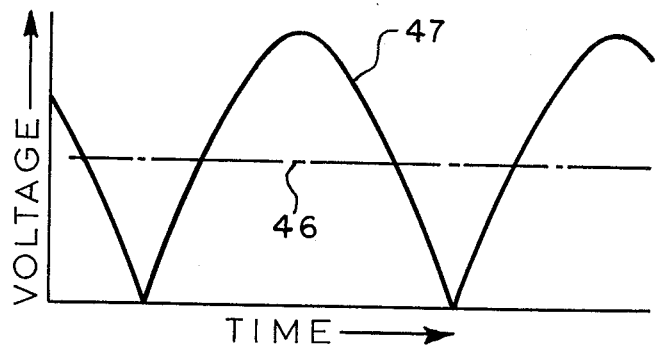

This operation will be better understood in connection with the illustrations of FIGS. 3 and 4. In operation, the three-phase voltage applied over the conductors 11a–11c is rectified in the circuit 12 to produce a d-c voltage with a ripple content on conductors 13a, 13b. This d-c voltage is represented by the waveform 45 in FIG. 3. It is apparent that this average voltage value is significantly above the predetermined reference value represented by the dash-dot line 46. This voltage, after being divided across the voltage divider network 37, 38, is sufficient to trigger the semiconductor unidirectional switch 41 and energize LED 42 to pass light (or radiation within any portion of the spectrum, so long as the radiation produces a corresponding response in the radiation-sensitive unit 43) to the phototransistor 43. Because there is relatively small ripple current flowing through the LED 42, there is very little variation in the emitted light, and thus the signal coupled to the photo-transistor 43 will be virtually constant and of a sufficiently large amplitude to saturate any suitable unit in detector circuit 16.

However, if the energy on any one of the input conductors 11a–11c is interrupted, the full wave d-c voltage at the output connections 13a, 13b will have a very large ripple, as represented by the waveform 47 in FIG. 4. Each time the voltage represented by waveform 47 goes to zero, it drops below the reference value line 46, and the semiconductor unidirectional switch 41 is turned off. Thus the current through LED 42 goes to zero and no radiation is transferred to the photo-transistor 43. This transistor remains dark for a few milliseconds, when the single-phase energy represented by the waveform 47 dips below the reference value line 46. When it rises above this value, the semiconductor unidirectional switch will again be triggered, and the same sequence of operations will occur.

Detector 16 can include a simple one shot multivibrator or similar unit. The portions of the waveform 47 shown below the reference line 46 are sufficient to discharge a normally-charging capacitor which provides a voltage for triggering pulses to produce a signal sustaining energization of relay 21 (FIG. 1) or inhibiting energization of alarm 18. Such a simple arrangement of a one-shot circuit is well known and understood by those skilled in the art. Suitable warning lights can be illuminated, or the machinery otherwise energized over the main conductors 10 can be de-energized in any desired manner.

TECHNICAL ADVANTAGES

The present system has proved extremely reliable, and is capable of installation in a simple, compact, completely solid state arrangement for high reliability. It has been found that the system operates suitably over a wide range of input voltages, for example from 342 to 528 volts, and over a frequency range of 50 to 60 hertz. Most importantly, fail-safe operation is provided by normally sustaining the ripple voltage 45 above the reference value 46, and only providing the signal from detector 16 when a single-phase voltage such as that shown in FIG. 4 is provided; that is a real advantage of the invention. It is also apparent that if the amplitude of the normal three-phase voltage drops significantly, it will fall below the reference value 46 and likewise either trigger alarm 18 or cause relay 21 to become de-energized. This provides effective protection of machinery which might otherwise be damaged by low-voltage operation during a "brown-out" or similar low voltage condition.

In one suitable circuit of the invention, the unit 41 was a silicon unidirectional switch of the type 2N4989, and the control circuit 14 was an H15A1 unit. The input protective resistors 31, 32 and 33 were each of 4.4K, 2 watts. In the voltage divider circuit the resistor 37 was 30K, 20 watts, and the other resistor 38 was a 1K ½ watt unit. These values are given solely by way of an example, to enable those skilled in the art to practice the invention with a minimum of experimentation, and in no sense are to be considered a constraint upon the invention.

In the appended claims the term "connected" means a d-c connection between two components with virtually zero d-c resistance between those components. The term "coupled" indicates there is a functional relationship between two components, with the possible interposition of other elements between the two components described as coupled or "inter-coupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A phase failure detection circuit for use with a power system in which multi-phase energy is passed over a plurality of main electrical conductors to energize an electrical load, comprising:
   a rectifier circuit, having a plurality of input connections coupled to the main electrical conductors, and having a pair of output connectors for providing a d-c voltage;

a radiation-emitting semiconductor, coupled to the rectifier circuit output connections to produce radiation as a function of the amplitude of the d-c voltage;

a voltage divider circuit coupled to the rectifier circuit output connections, which voltage divider circuit has an intermediate connection coupled to the radiation-emitting semiconductor, to reduce the amplitude of the voltage applied to the radiation-emitting semiconductor;

a unidirectional semiconductor switch, coupled between the intermediate connection of the voltage divider circuit and the radiation-emitting semiconductor;

a radiation-sensitive semiconductor, optically coupled to the radiation-emitting semiconductor, for providing an electrical control signal which varies as a function of incident radiation, which control signal remains above a predetermined reference value so long as the input energy is present on all main conductors; and a detector stage, coupled to the radiation-sensitive semiconductor, for providing an output signal when the control signal drops below the predetermined reference value, thus providing fail-safe operation of the detection circuit.

2. A phase failure detection circuit for use with a power system in which three-phase a-c energy is passed over at least three main electrical conductors to energize an electrical load, comprising:

a rectifier circuit having three input connections coupled to said three electrical conductors, a plurality of semiconductors connected to rectify the a-c energy, and a pair of output connections for providing a rectified voltage;

a voltage divider circuit coupled to the rectifier bridge circuit output connections, which voltage divider circuit includes an intermediate connection for providing a d-c voltage;

a semiconductor unidirectional switch, having a pair of connections, one of which is coupled to the intermediate connections of the voltage divider circuit;

a control circuit, including a radiation-emitting semiconductor, having one connection coupled to the other connection of the semiconductor unidirectional switch and another connection coupled to the voltage divider network, to produce radiation as a function of the amplitude of the d-c voltage at the intermediate connection of the voltage divider circuit, and also including a radiation-sensitive semiconductor, optically coupled to the radiation-emitting semiconductor, for providing an electrical control signal which varies as a function of incident radiation, which control signal remains above a predetermined reference value so long as the input energy is present on all main conductors; and a detector stage, coupled to the radiation-sensitive semiconductor, for providing an output signal when the control signal drops below the predetermined reference value, to provide fail-safe operation of the detection circuit.

3. A phase failure detection circuit as claimed in claim 2, and further comprising a relay, including a winding and a plurality of contact sets, which winding is coupled to the detector stage for actuation by the output signal, and which contacs are connected in series with the three main electrical conductors to interrupt the transfer of energy to the load upon operation of the relay, indicating power has been lost in at least one of the phase circuits.

4. A phase failure detection circuit as claimed in claim 2, and further comprising an alarm circuit, coupled to the detector circuit, for actuation by the output signal to indicate power has been lost in at least one of the phase circuits.

* * * * *